Figure 1:
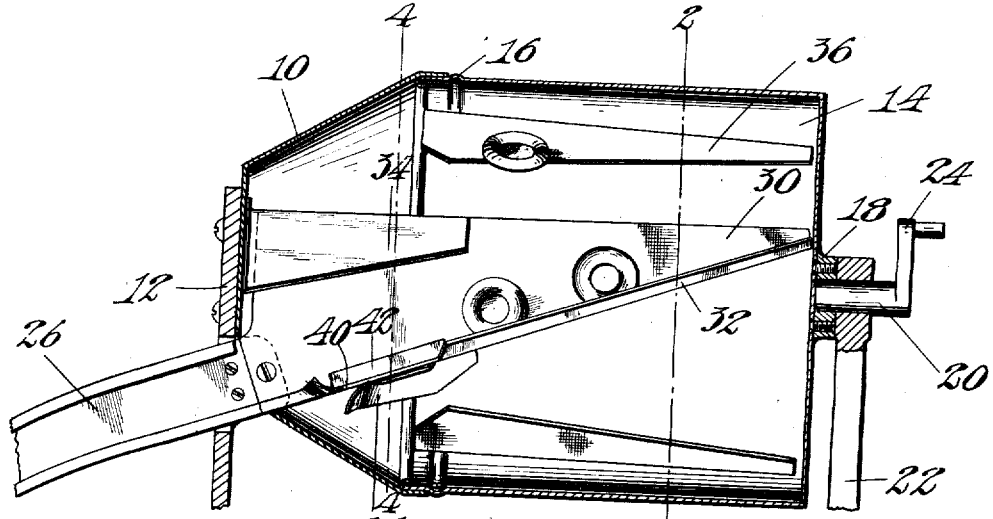

L. J. BAZZONI.
ASSORTING AND DELIVERING MECHANISM.
APPLICATION FILED JULY 31, 1911.

1,191,938.

Patented July 25, 1916.

WITNESSES
Herbert W. Kenway
Elizabeth C. Coup

INVENTOR.
Lewis J. Bazzoni
By his Attorney,
Nelson W. Howard

UNITED STATES PATENT OFFICE.

LEWIS J. BAZZONI, OF SWAMPSCOTT, MASSACHUSETTS, ASSIGNOR TO UNITED SHOE MACHINERY COMPANY, OF PATERSON, NEW JERSEY, A CORPORATION OF NEW JERSEY.

ASSORTING AND DELIVERING MECHANISM.

1,191,938.     Specification of Letters Patent.     Patented July 25, 1916.

Application filed July 31, 1911. Serial No. 641,486.

*To all whom it may concern:*

Be it known that I, LEWIS J. BAZZONI, a citizen of the United States, residing at Swampscott, in the county of Essex and State of Massachusetts, have invented certain Improvements in Assorting and Delivering Mechanisms, of which the following description, in connection with the accompanying drawings, is a specification, like reference characters on the drawings indicating like parts in the several figures.

This invention relates to mechanism for assorting and delivering circular articles having dissimilar faces such as gromets, washers, eyelets or the like and is herein shown as embodied in mechanism for delivering singly, and in predetermined position, washers from the mass contained in the hopper.

Broadly speaking, it is an object of the invention to simplify and improve assorting mechanism for such articles by reducing the number of moving parts of the assorting mechanism to a minimum and by so designing it that its operation is effected mainly by the action of gravity on the separate articles.

Another object of the invention is to provide mechanism which will operate uniformly and accurately upon washers or similar articles having only a slight difference of character in their opposite faces. Heretofore much difficulty has been encountered in automatically assorting washers having a concave and a convex face and little or no barrel. In assorting mechanism, as heretofore designed, obstruction has been caused frequently by two or more nested washers becoming caught in the outlet ports and when the washers have become nested they are likely to stay in this condition indefinitely and so reduce the efficiency of the mechanism.

Another object of the invention, accordingly, is to provide mechanism in which nested washers shall be separated and delivered singly.

One form of mechanism which produces the desired results is illustrated herein and includes an inclined runway down which the articles may roll on edge, together with means for delivering the articles promiscuously to the upper portion of the runway, the runway having at one point in its length a portion so shaped that improperly positioned articles shall be automatically discarded while properly positioned articles proceed without interruption. In handling gromets or washers in which the periphery of the flange is not centrally disposed with respect to the two side faces, it is necessary only to reduce the width of the bottom of the runway at one point to a distance less than the maximum distance of the plane of the periphery of the washer from its convex side but greater than the corresponding distance from its concave side. In passing down a runway of this character, each washer having its convex side toward the back or wall of the runway will leave the runway at the narrow point or gap while those washers which have their concave side toward the back of the runway have sufficient footing to roll by the gap. In handling washers in which the periphery of the flange is centrally located, a deflecting shoulder is arranged above the gap in the runway which shall engage the convex side of a washer and deflect it into the gap, while a washer having its concave side toward the back of the runway will pass the shoulder without being deflected.

An important feature of the invention consists in the provision of a guard adjacent to the gap in the runway so that articles having been once deflected from the straight course will be positively engaged and prevented from reaching the runway beyond the gap.

The features and advantages of the invention above enumerated, and others incident to the invention, will be best understood and appreciated from the following description of a preferred embodiment of the invention selected for purposes of illustration and shown in the accompanying drawings, in which,—

Figure 2:
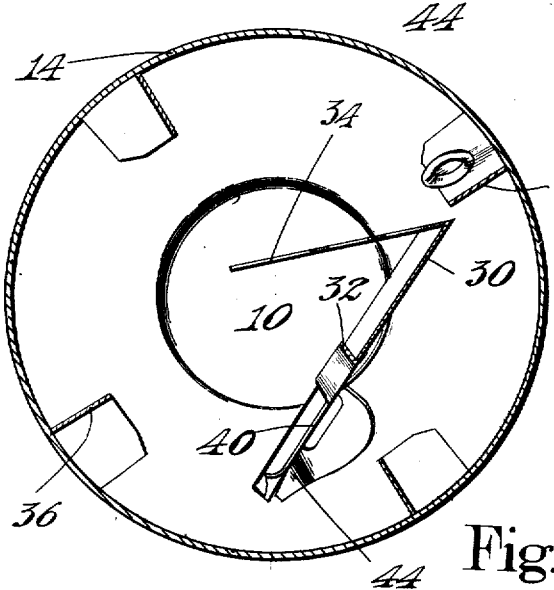
Figure 3:
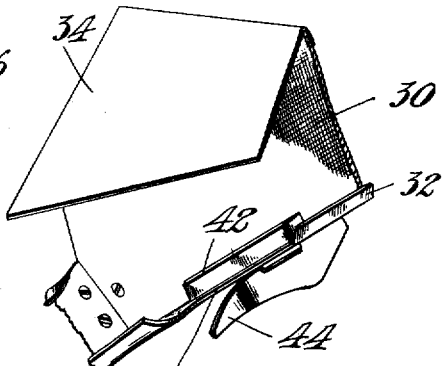
Figure 4:
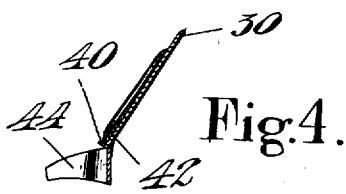
Figure 5:
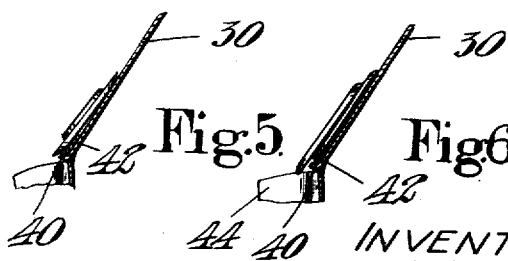
Figure 6:
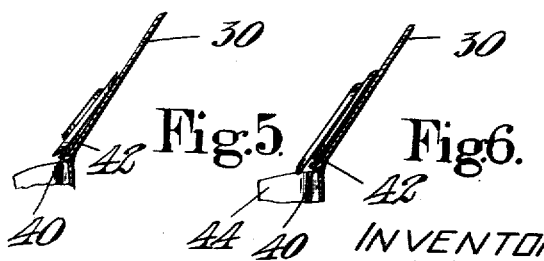

Figure 1 is a longitudinal sectional view; Figure 2 is a view in cross section on the line 2—2 of Fig. 1; Fig. 3 is a fragmentary view in perspective of the part on the runway at which the incorrectly positioned washers are discarded; Figs. 4, 5 and 6 are sectional views on the line 4—4 of Fig. 1 showing washers in different positions on the runway.

The front end of the casing 10 is of frustoconical shape and is attached to the stationary standard 12. The rear portion 14 of the casing is cylindrical in form and its open end is rotatably received within the end of the portion 10. At its rear end it is provided with a boss 18 in which is secured the end of a shaft 20 journaled in the standard 22. The shaft 20 is provided with a crank 24, or other suitable means, by which the portion 14 of the casing may be rotated. Displacement of the casing 14 is prevented by the standard 22 and by a raised bead 16 which bears against the rear end of the stationary portion 10.

The front wall of the portion 10 and the standard 12 are apertured to permit the passage of the raceway 26 which merges within the casing into an inclined runway. The runway comprises the wide back plate 30 and the bottom flange or rail 32. The plate 30 is inclined slightly from the vertical so that the washers lean upon it with their side faces while they roll down the inclined flange 32. The precise angle of the plate 30 is not important though it is preferably made such that the washers will rest only lightly upon it, most of their weight being sustained by the inclined flange 32. At its forward end the runway is provided with a shield 34 which prevents washers from being delivered to the forward end, where they might interfere with those already passing down the runway, but leaves the rear end of the runway unobstructed.

The washers are delivered to the runway from lifting shelves 36 which extend longitudinally of the inner surface of the casing 14. The shelves are slightly inclined toward the rear so that the washers which are carried thereby have a tendency to slide toward the rear and will be delivered to the upper end of the runway. On the rotation of the casing 14 the shelves carry washers from the mass in the hopper and deliver them promiscuously to the runway when they have reached a position slightly above the edge of the plate 30 as shown in Fig. 2.

It is desired to deliver to the raceway 26 only those washers which have their convex sides disposed outwardly and it is therefore necessary to discard improperly positioned washers from the runway before they reach the raceway. To this end the rail 32 is cut away at a point near the forward end of the casing 14 leaving only a narrow shoulder 40 which projects from the plate 30 such a short distance that a slight deflection of the washers in traversing this portion of the runway is sufficient to dislodge them. In order to deflect those washers which have their convex sides toward the plate 30 a narrow strip 42 is secured to this plate above the cut out portion in the flange 32. From an inspection of Figs. 4 and 5 it will be seen that the strip 42 has no effect on those washers which have their concave sides toward the plate 30 as the flange of such a washer is spaced from the plate 30 by its central projecting portion a distance greater than the thickness of the strip 42. In the case of a washer having its convex side toward the plate 30, however, the strip 42 acts to crowd the washer away from the plate so that it will roll off the narrow projecting part 40 of the flange 32.

The construction above described is also effective in separating two or more washers which may happen to be delivered to the runway in a nested position. Its operation under these circumstances is illustrated in Fig. 6 from which it will be seen that the flange of the outer washer or washers is held off the plate 30 by a distance greater than the width of the shoulder 40 by the washer resting on the plate 30. The result is that only the inner of the two washers can pass the cut out portion in the rail 32, the outer washers falling at this point into the casing. If the nested washers are disposed with their convex faces toward the back plate they will both be dislodged as in the case of single washers disposed in the same way.

In order to prevent positively a washer once dislodged by the strip 42 from jumping across the gap a guard comprising a deflecting strip 44 is attached to the under side of the runway and so arranged as to engage and deflect a washer as soon as it has been dislodged from the shoulder 40. On the forward side of the gap the bottom rail 30 is slightly flared in order to facilitate the entrance of washers to the lower part of the runway.

The casing 14 may be rotated in any convenient manner, as by connecting the crank 24 with a moving part of the machine. In practice it has been found that a relatively slow rotation of the casing will insure an ample supply of washers to the raceway.

Having thus described my invention, what I claim as new and desire to secure by Letters Patent of the United States is:—

1. In mechanism for assorting circular articles having dissimilar faces, the combination with an inclined runway down which the articles roll on edge, of means for supplying the articles promiscuously thereto, said runway having a deflecting device located out of the path of the periphery of all the articles but in position to act upon the side face of each of those articles having similar faces disposed in one direction to cause said articles to be deflected and leave the runway by gravity.

2. In mechanism for assorting circular articles having dissimilar faces, the combination with supplying means, of an inclined runway having a projecting flange, a cut out portion in said flange, and a deflecting member disposed with its acting face substantially parallel with said flange and above said cut out portion.

3. In mechanism for assorting circular articles having dissimilar faces, a runway having a bottom portion along which the articles may roll on edge in a straight path if disposed with similar faces in one direction, said bottom portion having a cut out portion by which articles disposed in the opposite manner may drop from the runway, means for dropping articles promiscuously upon the runway, and a shield located above the cut out portion of the bottom to prevent the articles dropped from striking those passing said cut out portion.

4. In mechanism for assorting circular articles having dissimilar faces, a runway having a bottom portion along which the articles may roll on edge in a straight path if disposed with similar faces in one direction, and means for deflecting from the straight path those oppositely disposed, said bottom portion having an opening through which deflected articles may leave the runway.

5. In mechanism for assorting circular articles having dissimilar faces, a runway having a back portion inclined slightly from the vertical, a bottom portion along which the articles may roll on edge while they are supported by the back portion in substantially vertical position, the bottom portion having a gap therein, and a deflecting member mounted on said back portion above said gap.

6. Mechanism for assorting washers having convex and concave faces, including an inclined runway for washers having a gap therein, and means located adjacent to the upper end of the gap for deflecting washers with their convex faces disposed in one direction so that they leave the raceway at said gap.

7. Assorting mechanism having, in combination, an inclined runway down which circular articles having dissimilar faces may pass, said runway having a portion so shaped as to deflect improperly positioned articles, and means for engaging the deflected articles and preventing their return to the runway after having been once deflected.

8. Assorting mechanism including an inclined runway down which circular articles having dissimilar faces may pass, said runway comprising a back plate arranged to support the articles on edge by engaging their faces and a stationary bottom rail having a portion of such width that articles having a certain one of their faces held away from said back plate shall pass downwardly through the bottom of the runway.

In testimony whereof I have signed my name to this specification in the presence of two subscribing witnesses.

LEWIS J. BAZZONI.

Witnesses:
  CHESTER E. ROGERS,
  MABEL A. SWETT.

3. In mechanism for assorting circular articles having dissimilar faces, a runway having a bottom portion along which the articles may roll on edge in a straight path if disposed with similar faces in one direction, said bottom portion having a cut out portion by which articles disposed in the opposite manner may drop from the runway, means for dropping articles promiscuously upon the runway, and a shield located above the cut out portion of the bottom to prevent the articles dropped from striking those passing said cut out portion.

4. In mechanism for assorting circular articles having dissimilar faces, a runway having a bottom portion along which the articles may roll on edge in a straight path if disposed with similar faces in one direction, and means for deflecting from the straight path those oppositely disposed, said bottom portion having an opening through which deflected articles may leave the runway.

5. In mechanism for assorting circular articles having dissimilar faces, a runway having a back portion inclined slightly from the vertical, a bottom portion along which the articles may roll on edge while they are supported by the back portion in substantially vertical position, the bottom portion having a gap therein, and a deflecting member mounted on said back portion above said gap.

6. Mechanism for assorting washers having convex and concave faces, including an inclined runway for washers having a gap therein, and means located adjacent to the upper end of the gap for deflecting washers with their convex faces disposed in one direction so that they leave the raceway at said gap.

7. Assorting mechanism having, in combination, an inclined runway down which circular articles having dissimilar faces may pass, said runway having a portion so shaped as to deflect improperly positioned articles, and means for engaging the deflected articles and preventing their return to the runway after having been once deflected.

8. Assorting mechanism including an inclined runway down which circular articles having dissimilar faces may pass, said runway comprising a back plate arranged to support the articles on edge by engaging their faces and a stationary bottom rail having a portion of such width that articles having a certain one of their faces held away from said back plate shall pass downwardly through the bottom of the runway.

In testimony whereof I have signed my name to this specification in the presence of two subscribing witnesses.

LEWIS J. BAZZONI.

Witnesses:
CHESTER E. ROGERS,
MABEL A. SWETT.

---

It is hereby certified that in Letters Patent No. 1,191,938, granted July 25, 1916, upon the application of Lewis J. Bazzoni, of Swampscott, Massachusetts, for an improvement in "Assorting and Delivering Mechanisms," an error appears in the printed specification requiring correction as follows: Page 1, line 73, after the word "back" insert the words *or wall;* and that the said Letters Patent should be read with this correction therein that the same may conform to the record of the case in the Patent Office.

Signed and sealed this 24th day of October, A. D., 1916.

[SEAL.]

F. W. H. CLAY,

*Acting Commissioner of Patents.*

It is hereby certified that in Letters Patent No. 1,191,938, granted July 25, 1916, upon the application of Lewis J. Bazzoni, of Swampscott, Massachusetts, for an improvement in "Assorting and Delivering Mechanisms," an error appears in the printed specification requiring correction as follows: Page 1, line 73, after the word "back" insert the words *or wall;* and that the said Letters Patent should be read with this correction therein that the same may conform to the record of the case in the Patent Office.

Signed and sealed this 24th day of October, A. D., 1916.

[SEAL.]

F. W. H. CLAY,

*Acting Commissioner of Patents.*